Dec. 19, 1922.
S. V. GRAMLICH.
SHOCK ABSORBER ATTACHMENT.
FILED JULY 1, 1920.
1,439,098.
2 SHEETS—SHEET 2.
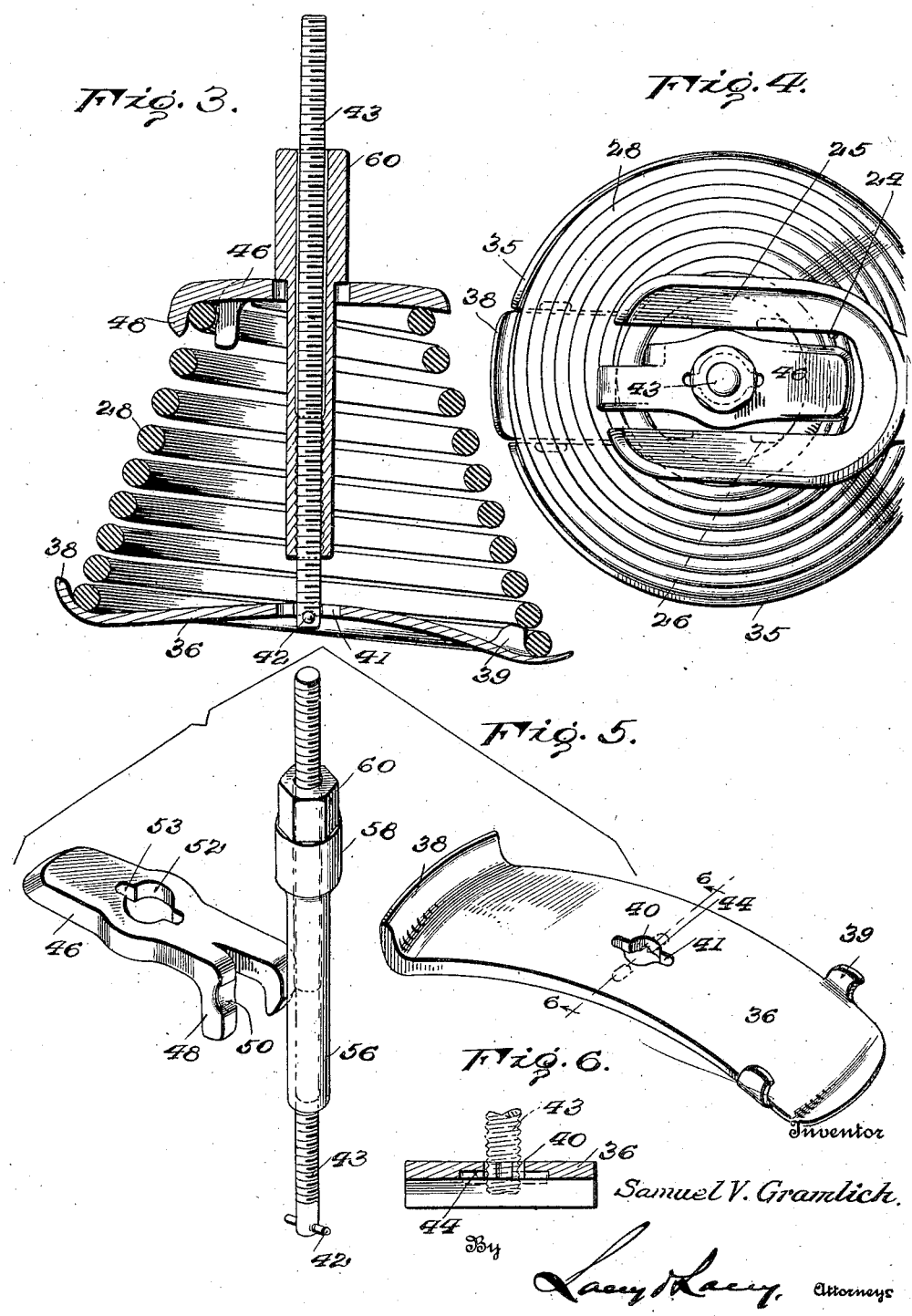

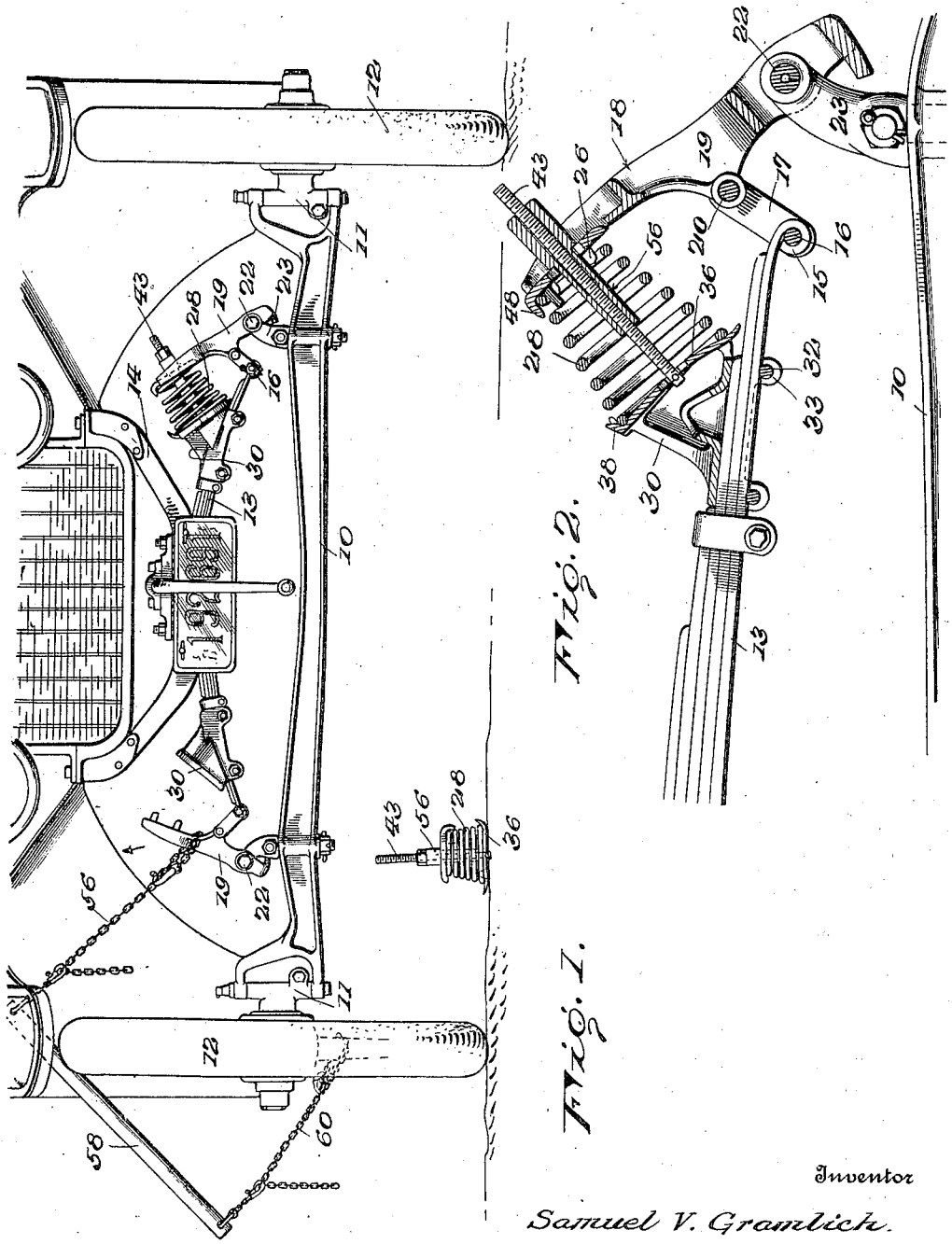

Patented Dec. 19, 1922.

1,439,098

UNITED STATES PATENT OFFICE.

SAMUEL V. GRAMLICH, OF PARADOX, COLORADO.

SHOCK-ABSORBER ATTACHMENT.

Application filed July 1, 1920. Serial No. 393,234.

*To all whom it may concern:*

Be it known that I, SAMUEL V. GRAMLICH, a citizen of the United States, residing at Paradox, in the county of Montrose and State of Colorado, have invented certain new and useful Improvements in Shock-Absorber Attachments, of which the following is a specification.

This invention relates to improvements in shock absorber attachments.

An important object of this invention is to provide a shock absorber attachment having novel means whereby the spring of the shock absorber may be readily and conveniently compressed preparatory to applying or removing the shock absorber.

A further object of the invention forming the subject-matter of this application is to provide a shock absorber attachment having a spring compressing plate adapted to be arranged at the base of the spring and provided with novel means to secure the spring in position.

The invention forming the subject-matter of this application aims also to provide in a shock absorber attachment reliable and easily operated means whereby the lever of the shock absorber may be held in a retracted position while the cushioning spring is removed.

A further object of the invention is to provide a shock absorber attachment which may be conveniently applied to the shock absorbers now in use without in any way altering the construction of the same.

A further object of the invention is to provide a shock absorber attachment which is desirable in use, of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a fragmentary front elevation of a vehicle having a pair of shock absorbers provided with the attachment forming the subject matter of this application, Figure 2 is a central vertical sectional view through a shock absorber applied, the same being provided with the attachment, Figure 3 is a central vertical sectional view through the helical spring of a shock absorber, the helical spring being shown compressed by means of the improved attachment, Figure 4 is a plan view of the spring of a shock absorber having the improved attachment, Figure 5 is a group perspective of the attachment, Figure 6 is a detail sectional view through the attachment.

In the drawings wherein for the purpose of illustration is shown a preferred embodiment of the invention, the numeral 10 designates the front axle of a motor vehicle and as usual is provided with spindles 11 to which wheels 12 are connected in the usual manner. As in the case of the Ford automobile, a front cross semi-elliptical spring 13 is arranged above the axle and is connected intermediate its ends to the depending forward end portion of a frame 14. The end portions of the laminated spring 13 are formed with barrels 15 which rotatably receive the pivot pins 16 extended through the lower ends of shackles 17. The vehicle herein illustrated is provided with shock absorbers generally designated by the numeral 18 and which comprise levers 19 connected intermediate their ends to the shackles 17 by means of pivot bolts 20. The rear portions of the levers 19 are horizontally pivoted by means of pivot elements 22 to the upper portions of perches 23 carried by the axle 10 adjacent the ends of the same.

Each lever 19 as is well known has its forward portion forked to provide a longitudinally extending slot 24 and side arms 25. The arms 25 of the lever are provided adjacent the slot 24 with spaced depending lugs 26 which extend into the upper convolutions of a helical spring 28, whereby the spring is prevented from lateral movement with relation to the lever. The lower portion of the helical spring is mounted upon the inclined bearing face or surface of a bracket 30 mounted upon the laminated spring and secured to the same by means of bolts 32 extended through depending apertured ears 33. The inclined bearing face of the bracket 30 is provided with a pair of approximately semi-circular flanges 35 between which the lower convolutions of the helical spring 28 are confined.

The invention forming the subject matter of this application comprises an elongated longitudinally curved spring compression plate 36 adapted to be mounted upon the inclined bearing face of the bracket 30 between the spaced ends of the upstanding flanges 35. One end portion of the elongated spring compression plate is extended upwardly as indicated at 38 so as to form a seat or groove for the lowermost convolution of the helical spring. The other end portion of the elongated spring compression plate 36 is provided with a pair of upstanding lugs 39 which are adapted to engage the inner sides of the lowermost convolution of the helical spring so as to co-operate with the upstanding end 38 in securing the spring against movement. The end of the spring compression plate 36 having the lugs 39 is tapered, rounded and curved somewhat so that upon the application of the spring 38 the elongated plate 36 may be forced into position between the semi-circular upstanding flanges 35. The elongated spring compression plate 36 is provided intermediate its ends with a bolt-receiving opening 40 and with diametrically opposed slots 41 which communicate with the opening 40 so that the pin 42 extended through one end of a bolt 43 may be extended through the plate. Upon extending the bolt 43 through the plate 36, the same is given a quarter of a turn so that the end portions of the pin 42 may be received within diametrically opposed grooves 44 in the under side of the plate 36.

A second spring compression plate 46 of elongated formation is arranged at the reduced upper end of the coiled spring and is provided with a longitudinal incision extending out through one end thereby forming a pair of lugs 48 which are extended angularly and disposed one in advance of the other so as to grip opposite sides of the uppermost convolution of the helical spring. The rear lug 48 is provided with a transverse notch 50 which prevents the lug from riding up above the convolution at the upper end of the spring. The upper spring compressing plate 46 of elongated formation is adapted to be arranged within the slot 24 of the lever 19 and is provided with an opening 52 for the reception of the bolt 43. The plate 46 also has opposed slots 53 which allow the pin 42 carried by the bolt 43 to be passed through the plate when assembling the shock absorber. The bolt 43 has threaded engagement with a sleeve nut 56 which rotatably extends through the opening 52 in the plate 46. An annular enlargement or shoulder 58 formed on the sleeve nut 56 adjacent the rear end of the same bears against the outer face of the plate 46 and when rotated serves to move the plate 46 in the direction of the plate 36 and thereby compress the helical spring. It will be observed that the sleeve nut 56 extends for a considerable distance into the helical spring and serves as a means for spacing the side wall of the opening 52 from the threads of the bolt 43 whereby said threads are prevented from becoming mutilated as the result of movement of the plate 46 with relation to the bolt. It will be noted by reference particularly to Figures 3 and 5 that the nut 56 is only threaded at its lower end to substantially one-third of its length and that the rest of the nut is smooth bored forming a sleeve for the bolt. By this arrangement, a very short bolt may be used and this has the advantage that the over all length of the tool will also be shorter so that, for this reason, it will be easier to remove than if the tool had a short nut with a long bolt extending considerably above the shock absorber. The rear portion of the sleeve nut 56 is polygonal sided as indicated at 60 so as to provide a means whereby a wrench may be engaged with the nut for the purpose of tightening or loosening the same.

One of the major difficulties present in connection with the use of the shock absorbers herein illustrated is the fact that it is extremely difficult and involves much labor to apply or remove the coiled springs, since it is necessary under ordinary conditions to remove the pivot elements 20, 22 and associated parts. With the use of this attachment it is merely necessary to compress the coiled spring preparatory to applying or removing the same by tightening up on the sleeve nut 58. In thus tightening up on the sleeve nut, the plates 36 and 46 are drawn together so that the spring is compressed and may when compressed be readily removed. Preparatory to removing the coiled spring the lever is engaged by a flexible element 66 which is detachably connected by any suitable means to a lever 68. The lever 68 may be extended over the adjacent wheel and swung downwardly so as to retain the lever 19 of the shock absorber in a retracted position. The rear end of the lever 68 may upon being swung downwardly be anchored to the wheel by means of a flexible element in the form of a chain 70. Upon locking the lever 19 in a retracted position and after the compression of the helical spring, the latter may be readily and conveniently detached for the purpose of replacement or for any other purpose.

With reference to the foregoing description, taken in connection with the accompanying drawings, it will be apparent that the attachment forming the subject matter of this application may be readily and conveniently applied to a shock absorber without in any way altering the construction of the vehicle or the shock absorber.

When applied the attachment does not interfere with the shock absorbing qualities of the spring or does it in any way interfere with the operation of the shock absorber. In fact, the attachment greatly strengthens and increases the utility of the shock absorber.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed as new is:

1. In an attachment for shock absorbers, the combination with an oblong base plate provided at one end with an upstanding flange and near its opposite end with lugs rising from the side edges of the plate, said flange and said lugs adapted to engage respectively with the exterior and interior peripheries of a coil at one end of a spring, a bolt detachably connected to said plate, a second plate loosely mounted on the bolt and provided at one end with depending spaced lugs adapted to embrace a coil at the other end of said spring, and a nut threaded upon the bolt and elongated to provide a sleeve extending through the latter plate whereby a comparatively short bolt may be used.

2. The combination with a shock absorber, of an assembling attachment therefor; said shock absorber including a coiled spring, a seat therefor and a lever engaging the other end of said spring, said seat and said lever having elongated apertures running at right angles to the axis of the spring; said assembling attachment comprising a pair of plates, a screw and a nut having engagement respectively with one of each of said plates, one of said plates fitting in the aperture of said seat and being provided with inner and outer coil engaging elements at its opposite ends including an upstanding flange and depending lugs; the other of said plates fitting in the aperture of said lever and provided with fingers gripping around a coil.

In testimony whereof I affix my signature.

SAMUEL V. GRAMLICH. [L. S.]